(No Model.)
C. L. BERGER.
ENGINEER'S Y-LEVEL.
No. 555,231.
2 Sheets—Sheet 2.
Patented Feb. 25, 1896.
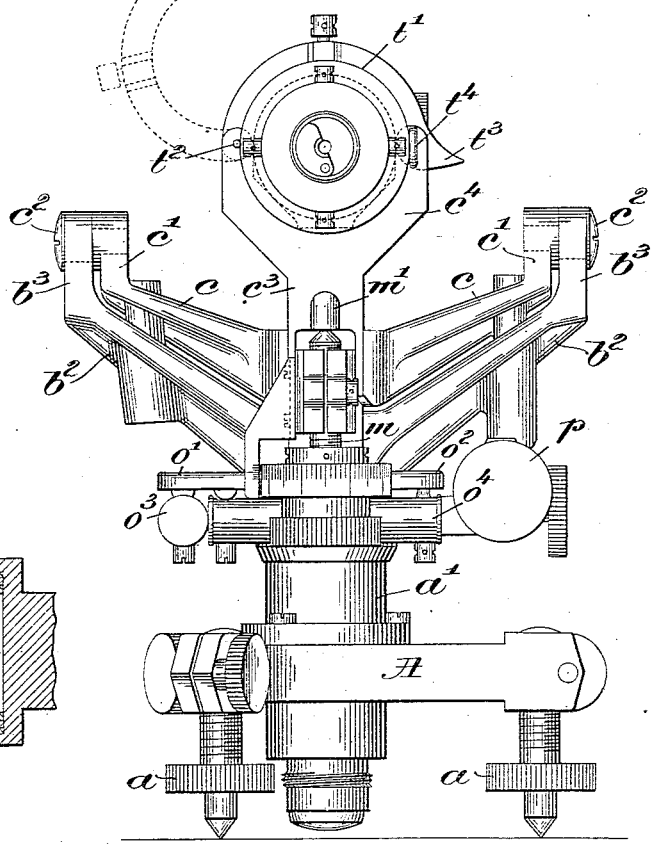
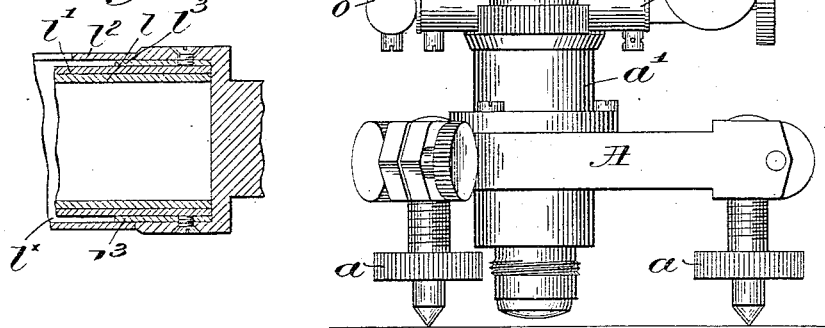
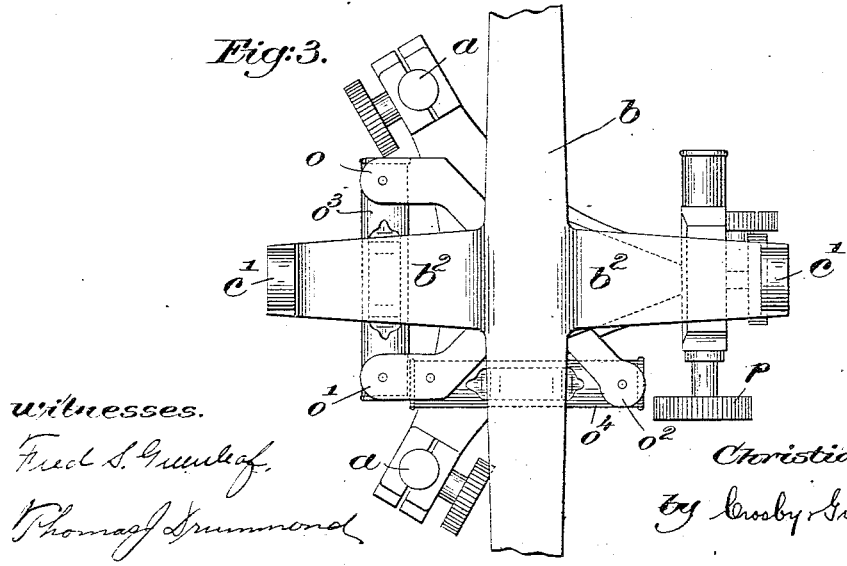
Witnesses.
Fred S. Greenleaf
Thomas J. Drummond
Inventor:
Christian L. Berger
by Crosby Gregory
attys.

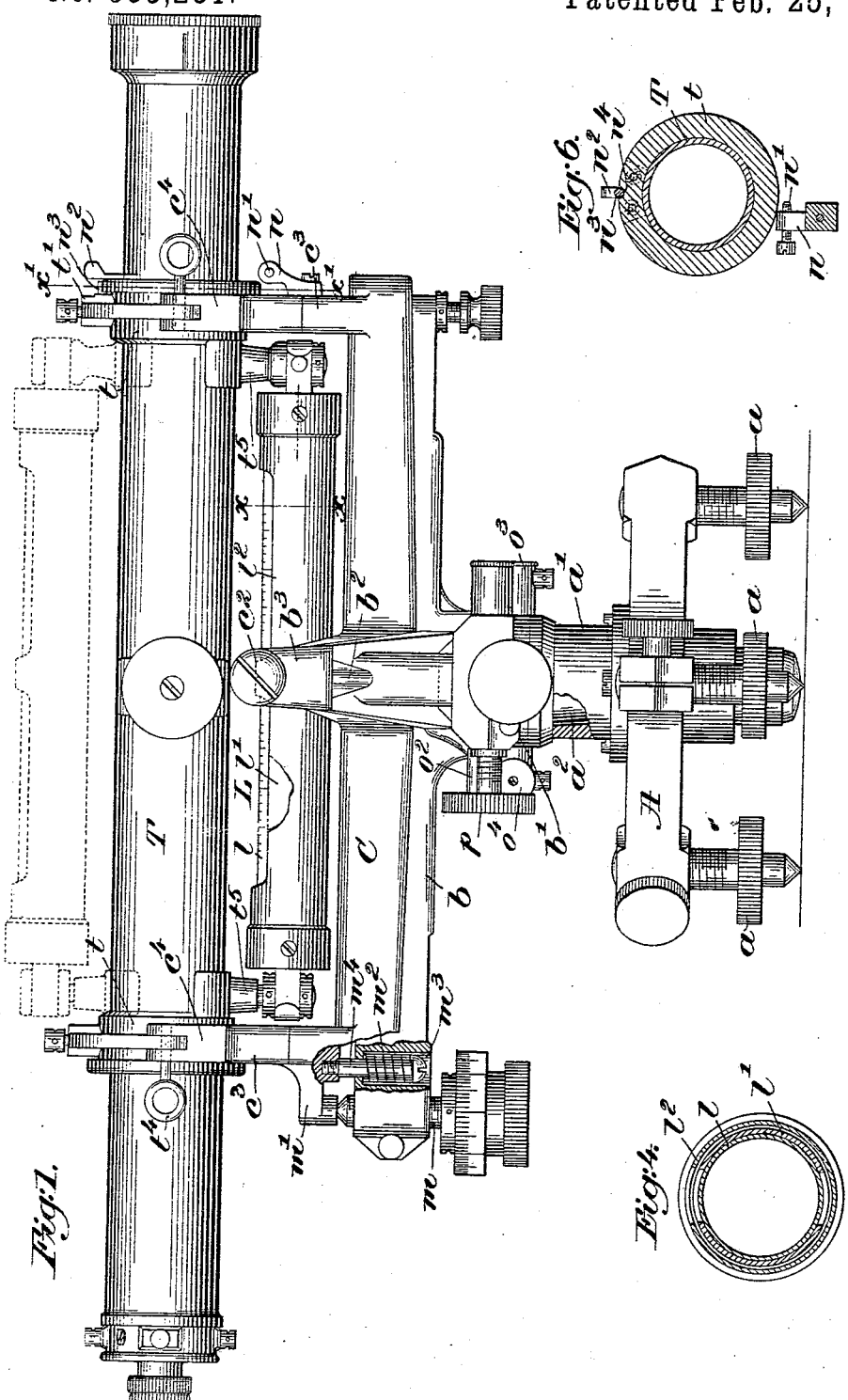

UNITED STATES PATENT OFFICE.

CHRISTIAN L. BERGER, OF BOSTON, MASSACHUSETTS.

ENGINEER'S Y-LEVEL.

SPECIFICATION forming part of Letters Patent No. 555,231, dated February 25, 1896.

Application filed October 31, 1894. Serial No. 527,517. (No model.)

*To all whom it may concern:*

Be it known that I, CHRISTIAN L. BERGER, of Boston, county of Suffolk, State of Massachusetts, have invented an Improvement in Engineers' Y-Levels, of which the following description, in connection with the accompanying drawings, is a specification, like letters on the drawings representing like parts.

This invention relates to what are commonly known as "engineers' Y-levels."

Y-levels as commonly constructed consist of a telescope mounted at or near its ends in Y-shaped supporting-bearings, connected by a fixed member or cross-bar, mounted in suitable manner upon and rotatable on the usual leveling-head carried by the tripod In levels of this class the leveling operation is performed by adjustment of the leveling-head upon which the cross-bar is mounted and rotatable.

Y-levels have also been constructed in which the Y-shaped supports or bearings have been connected by a member commonly known as a "cradle-bar," which is pivotally supported upon a cross-bar or other suitable support mounted upon and rotatable on the usual leveling-head.

The pivotal axis referred to in some instances intersects the vertical axis of the instrument and in other instances is arranged forward the said vertical axis or in the plane of one of the Y-supports. In this latter construction the leveling operation is performed by means of a suitable adjusting or micrometer-screw, which varies the position of the cradle-bar and telescope carried thereby with relation to the cross-bar, on which it is pivotally mounted.

My present invention relates particularly to instruments of the last-mentioned class, where adjustment of the level-bubble and the leveling operation are effected by means of a micrometer-screw between the cradle-bar and cross-bar, the one pivoted to the other.

In instruments of this class, as heretofore usually constructed, the cross-bar is arranged beneath the cradle-bar, and the axis of the pivot or pivots connecting the two has been located at a level with or below the cross-bar. Inasmuch as the Y supports or bearings project upwardly from the cradle-bar, the telescope is carried at a level considerably above that of the cradle-bar, so that when the cradle-bar is turned about its pivotal axis on the cross-bar during the process of leveling the telescope carried at a considerable distance above is moved bodily through the arc of a circle, the center of which is the pivotal axis referred to, and it necessarily follows that any considerable adjustment of the cradle-bar relatively to the cross-bar must vary to a greater or less extent the height of the telescope, rendering the instrument defective for precise work. To obviate this defect my present invention comprehends carrying the pivotal axis, which connects the cradle-bar with the cross-bar, upwardly above the former to a level at or near that of the axis of the telescope, so that when the cradle-bar is turned about its pivotal axis during the operation of leveling the height of the telescope is not materially changed. In carrying out this part of my invention I provide the cross-bar referred to with laterally and upwardly extended pivot-arms, in or near the ends of which are pivoted laterally and upwardly extended carrying-arms on the cradle-bar, whereby the pivotal axis is carried above the cradle-bar to attain the desired result. These laterally and upwardly extended arms on the cradle-bar and cross-bar, respectively, are spread to a considerable degree to admit of rotation of the telescope in its Y-bearings for the purpose of reversing and rotating the level, permanently suspended from the under side of the telescope between its Y-bearings, into position supported above the telescope for purposes of testing and adjustment.

My invention further comprehends providing the level referred to, or it may be any spirit-level mounted upon an instrument, with a rotatable shield separated from the level proper by an annular non-conducting air-space to prevent the level being affected by unequal temperatures.

My invention further comprehends providing the telescope with a reversion-level—that is, a level capable of being read from opposite sides—and protecting the said level by a rotatable shield provided at one side only with a sight-opening, which may by rotation of the shield be turned to one or the other side of the level to admit reading the latter in either its reverse positions, that portion of the shield opposite the sight-opening being provided with an illuminating-surface to better enable the level divisions and bubble to be seen and read at the opposite side of the level.

My invention further comprehends other details of construction and arrangement of parts to be hereinafter described and pointed out in the claims.

In the drawings, representing the preferred embodiment of my invention, Figure 1 is a side elevation of an engineer's Y-level, the position of the reversion-level above the axis of the telescope being represented in dotted lines, a portion of the cradle-bar being broken away to show the adjusting-spring, to be referred to. Fig. 2 is a view looking from the left of the instrument, Fig. 1—that is, toward the sight end of the telescope—showing one of the holding-clips turned back into dotted position; Fig. 3, a detail looking upon the top of the cradle-bar and showing the arrangement of tangent and binding screws and auxiliary levels used for approximate leveling up of the instrument; Fig. 4, a sectional detail taken on the dotted line $x\,x$, Fig. 1, illustrating the construction of the spirit-level and rotatable shield therefor; Fig. 5, a longitudinal sectional detail of one end of the level, showing the end bearings for the rotatable shield; and Fig. 6 a sectional detail taken on the dotted line $x'\,x'$, Fig. 1, to show the stops for limiting rotation of the telescope in its Y-bearings.

Referring to the drawings, in the preferred embodiment of my invention therein shown, the leveling-head A, mounted upon the usual leveling-screws $a$, provided with a socket $a'$, is and may be of usual construction and mounted in usual manner upon a tripod or other support. Mounted upon the leveling-head A and rotatable upon a center pivot, $a^2$, arranged within the socket $a'$, is a cross-bar $b$, provided with a hub $b'$, from which extend at diametrically-opposite points the laterally and upwardly extended carrying-arms $b^2$, having, as herein shown, their ends $b^3$ upturned. (See Fig. 2.)

C is what is commonly termed the "cradle-bar," the same in the present embodiment of my invention being ⊓-shaped in cross-section to fit down over and partially conceal the cross-bar, the said cradle-bar being provided with laterally and upwardly extended pivot-arms $c$, approximating in shape the carrying-arms $b^2$ of the cross-bar and having their upturned ends $c'$ pivoted by suitable screws $c^2$ to the said upturned ends $b^3$ of the carrying-arms of the cross-bar.

Referring to Fig. 1, the cradle-bar C at its opposite ends is provided with upwardly-extended standards $c^3$, made flaring at their upper ends to form Y-shaped supporting-bearings $c^4$, the interior shape of which is shown in dotted lines, Fig. 2, and in which rests the telescope T, of usual or suitable construction, the said telescope being herein shown as provided at its bearing-points with suitable bearing-collars $t$, which rest in the said Y-shaped bearings.

The telescope is retained in its bearings in suitable manner, as by the clips $t'$, pivoted at $t^2$ to one side of the Y-bearings and having their free ends $t^3$ adapted to be locked in suitable manner, as by pins $t^4$, to the opposite sides or arms of the Y-bearings.

Between the Y-bearings $c^4$, and shown as suspended from the telescope by suitable depending legs $t^5$, is the main spirit-level L, which may be of usual or suitable construction.

The spirit-level which I prefer to use is what is commonly known as a "reversion-level"—that is, a level (see Fig. 4) in which the glass tube $l$ is surrounded by a metal inclosing tube $l'$—which is provided at diametrically-opposite points—that is, at opposite sides its axis—with sight-openings through which the bubble within the glass tube may be read from either the top or the bottom of the glass tube.

A reversion-level is used to permit the telescope with its attached level to be rotated in its Y-bearings, as will be described, for adjusting and leveling purposes.

My present invention comprehends placing about the level proper, L, a rotatable tubular shield $l^2$, preferably separated from the metal inclosing tube $l'$ of the level by an annular non-conducting air-space $l^\times$ and having its bearings at the ends of the tube $l'$ upon suitable end bearings $l^3$. (Shown best in the detail, Fig. 5.) The rotatable shield $l^2$ is provided along one side with one or more sight-openings arranged in line, and which, when turned so as to register with one or the other of the opposite sight-openings in the inclosing tube of the level, enable the bubble to be seen. The interior of the rotatable shield is preferably painted white or provided with other suitable reflecting-surface, which, when turned beneath the sight-opening at one side of the leveling-glass, enables the bubble at the opposite side thereof to be read distinctly at the sight-opening at such opposite side.

When reading a reversion-level from one side it is difficult to read the bubble therein unless the sight-opening at the opposite side is covered, and not only covered, but by a reflecting or illuminating surface. The rotatable shield herein provided provides both these necessary features.

The cradle-bar, with its telescope, is turned upon its pivots $c^2$ by means of a micrometer-screw $m$ threaded in the cross-bar $b$, and, as herein shown, acting upon a projecting lug $m'$ on the Y-standard $c^3$, adjacent the eye end of the telescope. (See Fig. 1.) A spring $m^2$, arranged in the socket $m^3$ in the cross-bar, acts upon the head of a screw $m^4$, tapped into the under side of the cradle-bar to maintain the latter always in operative contact with the end of the micrometer-screw. By arranging the micrometer-screw and the spring acting in opposition thereto at the same side of the pivotal axis $c^2$, and close together, the leveling of the instrument by the micrometer-screw remains at all times accurate or unaffected by any looseness or wear at the pivotal point.

Referring now to Figs. 1 and 6, the Y-standard adjacent the object end of the telescope—that is, at the right, Fig. 1—is provided beneath the telescope with a lug $n$ in which is threaded an adjustable stop-screw $n'$, with which co-operates a projecting stop-finger $n^2$ on and rotatable with the telescope to limit the rotative movement of the latter in one direction—that is, to terminate the rotative movement when the reversion-level L has reached a truly vertical position one hundred and eighty degrees from its normal position, Fig. 1. The clip $t'$ at the same end of the instrument is herein shown as provided with a forwardly-projecting pin $n^3$, which is adapted to enter a groove $n^4$ in the flange of the telescope-collar $t$ to fix the normal position of the telescope, Fig. 1. The two positions of the telescope, separated by one hundred and eighty degrees, are thus accurately and permanently fixed, the one by the pin $n^3$ and groove $n^4$ and the other by the co-operating stops $n^2$ and $n$.

So far as I am aware I am the first to provide an engineer's Y-level with two stops to accurately assure the two opposite rotative positions of the telescope, one with the level beneath and the other with the level above the axis of the telescope.

Referring now to Figs. 1, 2, and 3, the hub $b'$ of the cross-bar $b$ is provided within a radius of one hundred and eighty degrees with three projecting arms $o$, $o'$ and $o^2$, between and from which are hung the two auxiliary levels $o^3$ and $o^4$ arranged at right angles to each other and close together, as shown, in order that both may be read from the same side of the instrument. The tangent-screw is shown at $p$.

Referring to Figs. 1 and 2, it will be seen that the horizontal axis of the pivot-screws $c^2$ approaches nearly to the plane of the telescope-axis and that any rotative movement of the telescope about the said horizontal axis will vary the height of the same to an imperceptible degree only, and the nearer to the plane of the telescope-axis this horizontal axis is carried the more nearly accurate will the instrument be in this respect. In carrying this horizontal axis to the height shown or higher, it is necessary to give to the carrying and pivot arms referred to a lateral and upward extension or curvature in order that the telescope with its attached reversion-level may be rotated in its Y-supports for testing and leveling purposes.

Where the horizontal pivot-axis referred to is arranged at or below the level of the cross-bar as heretofore, the telescope is caused to swing in an arc of such radius as to perceptibly change its height, but in my improved instrument this axis is carried to such a height that rotation of the telescope by the same does not perceptibly change its height, thereby materially increasing the accuracy of the instrument.

While I prefer to embody my invention in an instrument constructed substantially as herein shown, yet my invention is not necessarily limited to the particular arrangement and construction of parts shown, for it is evident the same may be varied without departing from the spirit and scope of the invention.

I claim—

1. In a Y-level, a support, a narrow cross-bar pivoted for horizontal movement thereon, and having at either side, adjacent said pivot, a lateral carrying-arm extending outwardly and upwardly therefrom, combined with a cradle-bar arranged immediately above and closely adjacent said cross-bar, and provided with lateral arms extending closely adjacent to and above said carrying-arms and pivoted thereto at their outer ends, a telescope, a level thereon, and Y-supports for said telescope at the ends of said cradle-bar to permit said level to lie immediately above and close to the said cradle-bar, whereby a compact Y-level of light weight and minimum height is provided, substantially as described.

2. An engineer's Y-level containing the following instrumentalities, viz: a support, a cross-bar pivoted at its middle thereto, and having adjacent said pivot opposite laterally and upwardly extended carrying-arms; a cradle-bar arranged parallel with the said cross-bar and also provided with opposite laterally and upwardly extended arms pivoted to and between the said carrying-arms, a telescope, and Y-supports for the same at or near the ends of and on the said cradle-bar, and an adjusting device, at one end of said cross-bar directly connected thereabove to the cradle-bar to positively move the same up and down, to adjust the level of the said cradle-bar, and its telescope, substantially as described.

3. An engineer's Y-level containing the following instrumentalities, viz: a support, a narrow cross-bar pivoted at its middle thereto, and having adjacent said pivot opposite laterally and upwardly extended carrying-arms; a cradle-bar arranged immediately above and closely adjacent the said cross-bar and also provided with opposite laterally and upwardly extended arms pivoted to and between the said carrying-arms and lying closely adjacent thereto, a telescope, Y-supports at the ends of said cradle-bar of a height only to permit said telescope and its reversion-level to swing clear of said cradle-bar and in which the said telescope is rotatable, the said reversion-level on and parallel with the axis of the said telescope, and swinging within and adjacent the said laterally and upwardly extended arms, and an adjusting device for and to adjust the level of the said cradle-bar and its telescope, substantially as described.

4. In an engineer's instrument, the combination with a telescope, of an attached reversion-level having top and bottom sight-openings, and a rotatable shield therefor provided at one side only with a sight-opening adapted to be turned by rotation of the shield into position to register with either the top or bottom sight-opening of the level, the interior of the said shield opposite its sight-opening being provided with a reflecting-surface, substantially as and for the purpose specified.

5. The combination with a spirit-level, of a rotatable shield surrounding the same and separated therefrom at all points to leave an annular non-conducting air-space surrounding the said level, substantially as described.

6. In an engineer's Y-level, the combination with a leveling-head as A, provided with a pivot, a cross-bar and its hub rotatable on said pivot, the cradle-bar and telescope pivotally mounted upon the said cross-bar, of the arms $o$, $o'$ and $o^2$ projecting from said hub and auxiliary levels suspended therefrom and clear of said hub, substantially as described.

7. An engineer's Y-level containing the following instrumentalities, viz: a telescope, Y-supports for and near the ends thereof, and a cradle-bar connecting the said supports, a rotatable cross-bar having laterally and upwardly extended carrying-arms between which said cradle-bar is pivoted, an adjusting-screw on one end of the said cross-bar, acting against said cradle-bar, and a spring close to the said adjusting-screw and holding the said cradle-bar against and in operative contact with the said adjusting-screw, substantially as described.

In testimony whereof I have signed my name to this specification in the presence of two subscribing witnesses.

CHRISTIAN L. BERGER.

Witnesses:
FREDERICK L. EMERY,
JOHN C. EDWARDS.